(12) United States Patent
Jiang et al.

(10) Patent No.: US 12,502,152 B2
(45) Date of Patent: Dec. 23, 2025

(54) INTELLIGENT GRADING METHOD AND SYSTEM FOR PULMONARY NODULES BASED ON MULTI-MODAL FEATURE FUSION

(71) Applicant: ZHENGZHOU UNIVERSITY, Henan (CN)

(72) Inventors: Huiqin Jiang, Henan (CN); Ling Ma, Henan (CN)

(73) Assignee: ZHENGZHOU UNIVERSITY, Henan (CN)

( * ) Notice: Subject to any disclaimer, the term of this patent is extended or adjusted under 35 U.S.C. 154(b) by 0 days.

(21) Appl. No.: 18/852,522

(22) PCT Filed: Jun. 11, 2024

(86) PCT No.: PCT/CN2024/098357
§ 371 (c)(1),
(2) Date: Sep. 30, 2024

(87) PCT Pub. No.: WO2025/020719
PCT Pub. Date: Jan. 30, 2025

(65) Prior Publication Data
US 2025/0255568 A1    Aug. 14, 2025

(30) Foreign Application Priority Data
Jul. 26, 2023 (CN) .......................... 202310927581.2

(51) Int. Cl.
*A61B 6/00* (2024.01)
*A61B 6/50* (2024.01)
(Continued)

(52) U.S. Cl.
CPC .............. *A61B 6/5217* (2013.01); *A61B 6/50* (2013.01); *G06T 7/0012* (2013.01); *G06V 10/25* (2022.01);
(Continued)

(58) Field of Classification Search
None
See application file for complete search history.

(56) References Cited

U.S. PATENT DOCUMENTS

2020/0093455 A1    3/2020 Wang
2022/0208355 A1*   6/2022 Li ........................... G06T 7/174

FOREIGN PATENT DOCUMENTS

CN    104881680 A    9/2015
CN    107103187 A    8/2017
(Continued)

OTHER PUBLICATIONS

International Search Report for PCT/CN2024/098357 mailed Aug. 30, 2024, ISA/CN.
(Continued)

*Primary Examiner* — Patricia J Park
(74) *Attorney, Agent, or Firm* — Yue (Robert) Xu; Apex Attorneys at Law, LLP

(57) ABSTRACT

Provided is an intelligent grading method and system for pulmonary nodules based on multi-modal feature fusion, including: obtaining ROI and VOI of pulmonary nodules based on chest CT examination images and examination reports by utilizing clinical multi-modal data from physical examination population, designing a multi-task feature extraction network based on attention mechanism, to obtain radiomics features and deep image features from the ROI and VOI; designing a cross-modal feature fusion method based on graph representation learning, designing a multi-modal information extraction method, obtaining specific feature representations and graph structures of modalities, and then fusing the feature representations and the graph structures; and proposing an optimization and clinical verification method of pulmonary nodule grading GCN model based on self-supervised learning, to realize fine grading of (Continued)

pulmonary nodule malignancy with slight differences, thereby providing a new approach to design of fine-grained classification algorithms.

12 Claims, 5 Drawing Sheets

(51) Int. Cl.
　　*G06T 7/00*　　　　(2017.01)
　　*G06V 10/25*　　　(2022.01)
　　*G06V 10/764*　　(2022.01)
　　*G06V 10/776*　　(2022.01)
　　*G06V 10/778*　　(2022.01)
　　*G06V 10/80*　　　(2022.01)
　　*G06V 10/82*　　　(2022.01)
　　*G06V 20/70*　　　(2022.01)
　　*G16H 50/30*　　　(2018.01)

(52) U.S. Cl.
　　CPC .......... *G06V 10/764* (2022.01); *G06V 10/776* (2022.01); *G06V 10/7792* (2022.01); *G06V 10/806* (2022.01); *G06V 10/82* (2022.01); *G06V 20/70* (2022.01); *G16H 50/30* (2018.01); *G06T 2207/10081* (2013.01); *G06T 2207/20081* (2013.01); *G06T 2207/20084* (2013.01); *G06T 2207/30064* (2013.01); *G06V 2201/032* (2022.01)

(56) References Cited

FOREIGN PATENT DOCUMENTS

| CN | 107280697 A | 10/2017 |
| CN | 110570405 A | 12/2019 |
| CN | 112365436 A | 2/2021 |
| CN | 112434718 A | 3/2021 |
| CN | 114972200 A | 8/2022 |
| CN | 115019405 A | 9/2022 |
| CN | 115409815 A | 11/2022 |
| CN | 116312782 A | 6/2023 |
| CN | 116883768 A | 10/2023 |
| WO | 2021022752 A1 | 2/2021 |
| WO | 2022063200 A1 | 3/2022 |

OTHER PUBLICATIONS

Li , Kang et., al. "MSA-GCN : A multi-information selection aggregation graph convolutional network for breast tumor grading" TechRxiv, Nov. 12, 2022, pp. 2-11.

CNIPA First Office Action corresponding to Application No. 202310927581.2; Issued date of Jul. 17, 2024.

Chinese Notification of Grant issued on Sep. 16, 2024 for the Chinese priority application No. 202310927581.2.

Method for pulmonary nodules segmentation based on low dose CT images, Application Research of Computers, Jan. 2017 vol. 34 No. 1 xiaoji hei et al.

* cited by examiner (1) Design a multi-task feature extraction network based on attention mechanism, to obtain an image feature description with adequacy and discriminability; where data of a two-dimensional region of interest (ROI) and a three-dimensional volume of interest (VOI) of pulmonary nodules is obtained based on chest CT examination images and corresponding imaging reports; radiomics features and deep image features are extracted from the ROI and the VOI, respectively; and feature fusion is performed to obtain the image feature description with adequacy and discriminability for pulmonary nodules (2) Design a multi-modal feature fusion method based on graph representation learning, to obtain an overall sample feature graph with effective fusion of cross-modal features; where a specific feature representation and a graph structure of each modal are obtained, through a multi-modal information extraction method, based on CT imaging reports, clinical information, serological examinations and CT image features, and the feature representations and the graph representation structures obtained from different modalities are fused by using attention mechanism, to obtain the overall sample feature graph with cross-modal feature fusion (3) Propose an optimization and clinical verification method based on self-supervised learning GCN classification model, to form a pulmonary nodule grading and diagnosis model; where a pulmonary nodule grading GCN model is constructed, including a classification network, a weight learning network and a self-supervised network, an overall loss function is designed, and the pulmonary nodule grading GCN model is trained and optimized to achieve fine grading of pulmonary nodule malignancy with slight differences Grade pulmonary nodules according to the pulmonary nodule grading GCN model

FIG. 1

INTELLIGENT GRADING METHOD AND SYSTEM FOR PULMONARY NODULES BASED ON MULTI-MODAL FEATURE FUSION

This application is the national phase of International Patent Application No. PCT/CN2024/098357, titled "INTELLIGENT GRADING METHOD AND SYSTEM FOR PULMONARY NODULES BASED ON MULTI-MODAL FEATURE FUSION", filed on Jun. 11, 2024, which claims priority to Chinese Patent Application No. 202310927581.2 titled "INTELLIGENT GRADING METHOD AND SYSTEM FOR PULMONARY NODULES BASED ON MULTI-MODAL FEATURE FUSION", filed on Jul. 26, 2023 with the China National Intellectual Property Administration (CNIPA), both of which are incorporated herein by reference in their entireties.

FIELD

The present disclosure relates to an intelligent grading method and system for pulmonary nodules based on multi-modal feature fusion.

BACKGROUND

Low-Dose Computed Tomography (LDCT) is an important measure of detecting early lung cancer and can reduce lung cancer mortality by 20%. However, with the rapid growth of medical imaging data, there is a serious shortage of radiologists. Relying solely on radiologists for diagnosis is prone to missed or mistaken diagnosis due to fatigue or other subjective factors. According to statistics, about 30% of pulmonary nodules surgically removed during early treatment are benign nodules, which means that for every lung cancer death prevented, 1.38 cases of over diagnosis may occur. This not only increases mental and economic burdens on patients, but also causes a huge waste of social medical resources. Therefore, how to correctly evaluate malignancy of pulmonary nodules detected by LDCT screening and assist doctors in taking correct clinical management measures becomes an important clinical issue that needs to be solved urgently in lung cancer screening.

Lung imaging reporting and data system (Lung-RADS) is a low-dose CT scan-based lung cancer screening classification standard issued by the American College of Radiology (ACR), aiming to correctly classify, describe and treat pulmonary nodules, standardize follow-up and treatment decisions, avoid unnecessary repeated examinations and inappropriate intervention, and minimize patient anxiety and doctor confusion to the greatest extent. The Lung-RADS classification is based on type, size, and growth of nodules, and divides pulmonary nodules into four grades according to a degree of malignancy from low to high: Grade 1 and Grade 2 indicate a benign nodule, for which a treatment advice is to to perform CT examination once a year; Grade 3 indicates a low-risk nodule, which requires CT examination once every six months; Grade 4 is further divided into three sub-grades, where Grade 4A indicates an intermediate-risk nodule, requiring CT examination once every three months, and Grade 4B and Grade 4X indicate high-risk nodules, requiring further detailed examination or surgery. Although doctors may make clinical diagnose on pulmonary nodules according to the Lung-RADS grading standard to reduce false positives of the LDCT screening to a certain extent, there is a lack of intelligent diagnostic tools corresponding to the Lung-RADS grading standard, which results in a low sensitivity when applying the Lung-RADS to clinics, and may cause delayed diagnosis of malignant pulmonary nodules.

According to the research and cost analysis results of baseline lung cancer screening and lung nodule management strategies in the United States, combining the Lung-RADS grading with artificial intelligence (AI) may reduce the number of follow-up examinations and significantly save costs. Therefore, it is necessary to adapt the Lung-RADS grading standard for Asian populations and adaptively study an intelligent grading tool for pulmonary nodule malignancy, to promote standardization of clinical diagnosis and treatment of pulmonary nodules.

With the rapid development of AI technology in recent years, AI technology not only plays an important role in automatic detection of pulmonary nodules, but can also provide an auxiliary reference for clinical diagnosis in identification of benign and malignant pulmonary nodules. However, accuracy of the AI technology is not adequate yet to replace manual work. Doctors usually comprehensively utilize CT images, laboratory data, age, gender, smoking history, past tumor history, family tumor history, and other clinical information to evaluate the malignancy of pulmonary nodules. As can be seen, the intelligent grading and diagnosis of pulmonary nodules is a multi-modal learning problem. In multi-modal learning, a feature representation can be better learned by taking advantage of complementarity of multi-modal data and eliminating redundancy among modalities. Hence, the multi-modal learning shows outstanding potential in diagnosis and identification of benign or malignant pulmonary nodules.

According to a Chinese Patent Application No. 201710230623.1, a detection, grading, and management method and system for pulmonary nodules based on deep learning is disclosed. The method includes: collecting ultra-low-dose spiral CT thin-section image of the chest, drawing the outline of a lung region in the CT image, and labeling all pulmonary nodules in the lung region; training a pulmonary parenchymal segmentation network, a suspected pulmonary nodule detection network and a pulmonary nodule screening and grading network; obtaining the pulmonary nodule time series of all patients in an image set and corresponding grading information annotations, and constructing a pulmonary nodule management database; and training a lung cancer diagnosis network based on a three-dimensional convolutional neural network and a long short-term memory network. In the detection, grading, and management method and system for pulmonary nodules based on deep learning disclosed in this Chinese Patent Application, the pulmonary parenchymal segmentation network, the suspected pulmonary nodule detection network, the pulmonary nodule screening and grading network, and the lung cancer diagnosis network are trained, so that pulmonary nodules can be accurately detected. This solution may have a certain auxiliary diagnostic role in clinical application, but fails to comprehensively utilize multi-modal data such as CT images, age, gender, smoking history, previous tumor history, and family tumor history for evaluating malignancy of pulmonary nodules. Utilizing only the CT image information for detection and grading has limited accuracy and lacks guiding value for further clinical treatment of nodules.

Chinese Patent Application No. 201710340309.9 discloses a grading method and system for pulmonary nodules based on deep learning and data fusion. The method includes: preprocessing multiple computer tomography CT lung images, to obtain preprocessed CT pulmonary nodule images; extracting image features of the CT pulmonary nodules, and pre-classifying the pulmonary nodule images according to the image features; performing repeated training and iteration based on the pre-classified image features of pulmonary nodules and corresponding clinical diagnosis data, to obtain a diagnostic model; and grading the pulmonary nodules based on the diagnostic model. The grading method and system for pulmonary nodules disclosed in this application utilizes the pre-classified pulmonary nodule image features and the corresponding clinical diagnosis data, to improve an accuracy in predicting malignancy of pulmonary nodules to a certain extent. However, the image features of pulmonary nodules and non-imaging features (such as gender, age, and smoking history) from different sources have different contributions to the assessment of malignancy of pulmonary nodules, leading to a problem of how to realize effective cross-modal fusion of the image features from CT examinations and the non-imaging features of clinical diagnosis data. That is, how to enable efficient and accurate clinical grading and diagnosis of pulmonary nodules according to the Lung-RADS grading standard, achieve four fine-grained grading of malignancy of pulmonary nodules to assist doctors in scientific evaluation and treatment of pulmonary nodules and avoid delayed diagnosis or over diagnosis of lung cancer, and realize reasonable allocation of medical resources while maximizing patient benefits is still a challenging problem in clinical practice.

SUMMARY

To solve the problem in the existing technology, an intelligent grading method and system for pulmonary nodules based on multi-modal feature fusion is provided in the present disclosure.

An intelligent grading method for pulmonary nodules based on multi-modal feature fusion is provided, including:

(1) designing a multi-task feature extraction network based on attention mechanism, to obtain an image feature description with adequacy and discriminability; including obtaining data of a two-dimensional region of interest (ROI), and a three-dimensional volume of interest (VOI), of pulmonary nodules based on chest CT examination images and corresponding imaging reports, extracting radiomics features and deep image features from the two-dimensional ROI and the three-dimensional VOI, respectively; and performing feature fusion to obtain the image feature description with adequacy and discriminability for the pulmonary nodules;

(2) designing a multi-modal feature fusion method based on graph representation learning, to obtain an overall sample feature graph with effective fusion of cross-modal features; including obtaining a specific feature representation and a graph structure of each modal through a multi-modal information extraction method, based on CT imaging reports, clinical information, serological examinations and CT image features, and fusing the feature representations and the graph representation structures obtained from different modalities by using attention mechanism, to obtain the overall sample feature graph with cross-modal feature fusion;

(3) proposing an optimization and clinical verification method based on self-supervised learning GCN (graph convolutional network) classification model, to form a pulmonary nodule grading and diagnosis model; including constructing a pulmonary nodule grading GCN model, which includes a classification network, a weight learning network and a self-supervised network, designing an overall loss function, and training and optimizing the pulmonary nodule grading GCN model to achieve fine grading of pulmonary nodule malignancy with slight differences; and grading pulmonary nodules with the pulmonary nodule grading GCN model.

In an embodiment, the non-image feature includes feature metrics derived from CT examination reports, clinical information, and serological examination data.

In an embodiment, in the designed multi-task feature extraction network based on attention mechanism, the radiomics features and the deep image features are calculated in parallel based on the two-dimensional ROI and the three-dimensional VOI of CT images, respectively, and the radiomics features and the deep image features are effectively fused based on attention mechanism. In a training stage of a learning feature fusion layer parameter model, subsequent classification tasks are considered, and a CT feature semantic label consistency measurement task is designed for coordinated feedback; and the image feature description with adequacy and discriminability for the pulmonary nodules is obtained through parallel learning and training of the two tasks and sharing the learned feature parameters.

In an embodiment, a process of obtaining the deep image features corresponding to the three-dimensional VOI data includes: inputting the three-dimensional VOI data to a feature extraction backbone network that combines a 3D convolutional neural network (3D CNN) and a Transformer, to obtain the deep image features with fused three-dimensional local-global multi-scale structural information.

In an embodiment, a process of fusing the radiomics features and the deep image features to obtain fused features includes: fusing the radiomics features and the deep image features based on attention mechanism.

In an embodiment, the designed multi-modal feature fusion method based on graph representation learning includes:

obtaining the specific feature representation and the graph structure of each modality through the multi-modal information extraction method; and then fusing the feature representations and graph structures obtained from different modalities by using attention mechanism, to obtain data of the overall sample feature graph with cross-modal feature fusion.

It is assumed that set $X=(X^1, X^2, \ldots, X^M)$ represents multi-modal feature information inputted originally, where $X^m=[x_1^m, x_2^m, \ldots, x_N^m] \in R^{N \times d_m}$, $m \in [1,M]$ represents a feature matrix of the m-th modality having N samples, and a feature dimension of the modality is $d_m$.

(1) Multi-Modal Information Extraction Method

A purpose of the multi-modal information extraction method is to extract a specific modal feature and graph structure from each piece of modal information, which is implemented by designing a modal information extraction network.

For simplicity, $X'=[x_1, x_2, \ldots, x_N] \in R^{N \times d}$ represents an original feature matrix of a modal selected arbitrarily as an input to the modal information extraction network. To improve a computational efficiency and performance of the model, the original input feature vector $x_i$ is projected to a low-dimensional feature space through a learnable function $f_A$, where $f_A$ is defined as a simple multi-layer perceptron (MLP), and a calculation process is expressed as equation (1):

$$\hat{x}_i = w_A^{(2)} \sigma \left( w_A^{(1)} x_i + b \right) \quad (1)$$

where $w_A^{(1)} \in R^{d \times d_\perp}$, $w_A^{(2)} \in R^{d_\perp \times d_2}$ represent learnable weight parameters, and $\sigma$ represents a nonlinear activation function.

Then, a correlation between pairs of samples is calculated through cosine similarity, to obtain a similarity matrix $S \in R^{N \times N}$ characterizing the correlation between overall sample features, where a similarity between any two sample features is calculated through equation (2). For example, similarity $s_{ij}$ between sample j and sample j is calculated as:

$$s_{ij} = \frac{\hat{x}_i \cdot \hat{x}_j}{|\hat{x}_i| \cdot |\hat{x}_j|} \quad (2)$$

A threshold processing as shown in equation (3) is performed on the similarity matrix S to obtain an adjacency matrix of the modality-specific graph structure:

$$A = \{(a_{ij})_{i,j=1}^N\} \in R^{N \times N} \quad (3)$$

$$a_{ij} = \begin{cases} s_{ij}, & s_{ij} > \theta \\ 0, & \text{otherwise} \end{cases}$$

where $\theta$ represents a threshold ranging from 0 to 1.

The feature matrix X and the graph structure A are inputted to a graph neural network to perform a feature aggregation transformation, and a calculation process from each input layer to an output layer of the graph neural network is expressed as equation (4):

$$H^{(l)} = \sigma \left( \mu_1 H^{(l-1)} W_e^{(l)} + \mu_2 D^{-1} A H^{(l-1)} W_n^{(l)} \right) \quad (4)$$

where $\sigma$ represents a nonlinear activation function; $\mu_1$ and $\mu_2$ represent learnable weight coefficients; $W_e^{(l)}$ and $W_n^{(l)}$ represent two weight matrices to be learned of the l-th layer of the graph neural network; and D represents a degree matrix of an adjacency matrix A. There has $H^{(o)} = X$. Through feature update of the graph neural network, the output layer H of the graph neural network is defined as an optimized feature representation $\tilde{X}$ of the modality.

The original feature vector X of each modality is used as an input, the optimized graph structure A and the feature representation $\tilde{X}$ of the modality are obtained through the modal information extraction network.

(2) the Cross-Modal Feature Fusion Based on Attention Mechanism

The cross-modal feature fusion based on attention mechanism refers to fusion of the multi-modal feature set $\tilde{X} = \{\tilde{X}^1, \tilde{X}^2, \ldots, \tilde{X}^M\}$ and the multi-modal graph structure set $A = \{A^1, A^2, \ldots, A^M\}$ obtained from different modalities through attention mechanism, to obtain a cross-modal feature representation.

A feature of the i-th node is expressed as $x_i = [x_i^1, x_i^2, \ldots, x_i^M] \in R^{1 \times (M \times h)}$, and an attention score of each modality is obtained based on attention mechanism:

$$(\alpha^1, \alpha^2, \ldots, \alpha^M) = att(\tilde{x}^1, \tilde{x}^2, \ldots, \tilde{x}^M).$$

First, the multi-modal features are transformed through a nonlinear transformation, and then a shared attention vector q is used to obtain an attention value $\omega_i^m$:

$$\omega_i^m = q^T \text{Sigmoid}(W(\tilde{x}_i^m)^T + b) \quad (5)$$

where $W \in R^{h \times h}$ and $q \in R^{h \times 1}$ both represent learnable weight parameters. After the attention value of each modality is calculated, attention scores of all modalities are obtained through normalization:

$$a_i^m = \text{soft max}(\omega_i^m) = \frac{\exp(\omega_i^m)}{\sum_{m=1}^M \exp(\omega_i^m)} \quad (6)$$

The attention scores of the modalities are multiplied with the optimized feature and graph structure of the modalities correspondingly, and a summing operation is performed to obtain a final fused multi-modal feature and graph structure:

$$x_i^{final} = \sum_{m=1}^M \alpha_i^m \tilde{x}_i^m \quad (7)$$

$$a_i^{final} = \sum_{m=1}^M \alpha_i^m a_i^m \quad (8)$$

(3) Classification Prediction Based on Graph Neural Network

The final feature matrix $X^{final}$ and the graph structure $A^{final}$ are sent to a graph neural network classifier to output a final classification prediction result.

In an embodiment, the overall loss function is composed of a weighted cross-entropy loss function, a semantic constraint loss function and a self-supervised contrastive loss function.

In an embodiment, the overall loss function is expressed as equation (9)

$$L_{GL} = \alpha_1 L_{WCE} + \alpha_2 L_{SCL} + \alpha_3 L_{SSL} \quad (9)$$

where $\alpha_1$, $\alpha_2$, and $\alpha_3$ represent trade off hyper-parameters, $L_{WCE}$ represents the weighted cross-entropy loss function, $L_{SCL}$ represents the semantic constrain loss function, and $L_{SSL}$ represents the self-supervised contrastive loss function.

The weighted cross-entropy loss function is expressed as equation (10):

$$L_{WCE} = \max_{\beta^{c_i}} \min_D - \sum_{c=1}^{|C|} \sum_{i=1}^{|Y_L^c|} \beta_i y_c^i \log(q_i^c). \quad (10)$$

The semantic constraint loss function is expressed as equation (11):

$$L_{SCL} = \frac{1}{E} \sum_{i=1}^E W(\hat{Y}, Y) \quad (11)$$

The self-supervised contrastive loss function is expressed as equation (12):

$$L_{SSL} = \frac{1}{N \cdot E} \sum_{u \in E} \sum_{\substack{i=1 \\ j=1 \\ i \neq j}}^{E} L\left(Z_u^{(i)}, Z_u^{(j)}\right) \qquad (12)$$

Here, E represents the number of views, $W(\widetilde{Y^{(j)}}, Y)$ represents a distance measure between the j-th view class label distribution and an original view class label distribution.

An intelligent grading system for pulmonary nodules based on multi-modal feature fusion is further provided. The system includes a processor and a memory. The processor is configured to process instructions stored in the memory to implement the intelligent grading method for pulmonary nodules based on multi-modal feature fusion as described above.

The present disclosure has the following beneficial effects. In terms of medical image analysis, a multi-task learning model based on simultaneous extraction and fusion of three-dimensional CNN convolution features and semantic features such as two-dimensional texture is designed; an effective multi-dimensional and multi-type image feature fusion module is designed based on attention mechanism; and a precise feature description that fuses local-global multi-scale structural information and has semantic consistency is obtained. Thereby, a new method for small target feature extraction based on three-dimensional CT images is provided. In terms of multi-modal data analysis, by proposing a method for effective fusion of multi-modal optimized feature graph construction based on adaptive graph representation learning and cross-modal feature graph based on attention mechanism, a high-precision GCN multi-classification algorithm with cross-modal feature fusion is designed. Thereby, fine grading of pulmonary nodule malignancy is achieved with slight differences, providing a new approach to design of fine-grained classification algorithms. In terms of solving clinical problems, a classification algorithm optimization method and clinical verification scheme that organically combines generative self-supervised learning and comparative self-supervised learning is proposed, which can form an intelligent diagnosis model for pulmonary nodules and is expected to assist doctors in scientific evaluation and treatment of pulmonary nodules. Hence, delayed diagnosis or over diagnosis of lung cancer is avoided, and standardization of clinical diagnosis and treatment of pulmonary nodules is promoted.

BRIEF DESCRIPTION OF THE DRAWINGS

FIG. 1 is an overall flow chart of an intelligent grading method for pulmonary nodules based on multi-modal feature fusion provided in the present disclosure;

DETAILED DESCRIPTION

An intelligent grading method for pulmonary nodules based on multi-modal feature fusion is provided in an embodiment, as shown in FIG. 1. An overall idea of the intelligent grading method for pulmonary nodules based on multi-modal feature fusion provided in the embodiment is as follows: designing a multi-task learning model for accurate extraction and effective fusion of multi-dimensional and multi-type CT image features based on attention mechanism; constructing effective cross-modal feature fusion graph data of multi-source heterogeneous data, and proposing a graph convolutional neural network based pulmonary nodule grading algorithm based on adaptive graph representation learning; and designing a pulmonary nodule grading algorithm optimization and clinical verification scheme based on self-supervised learning.

Figure 2:
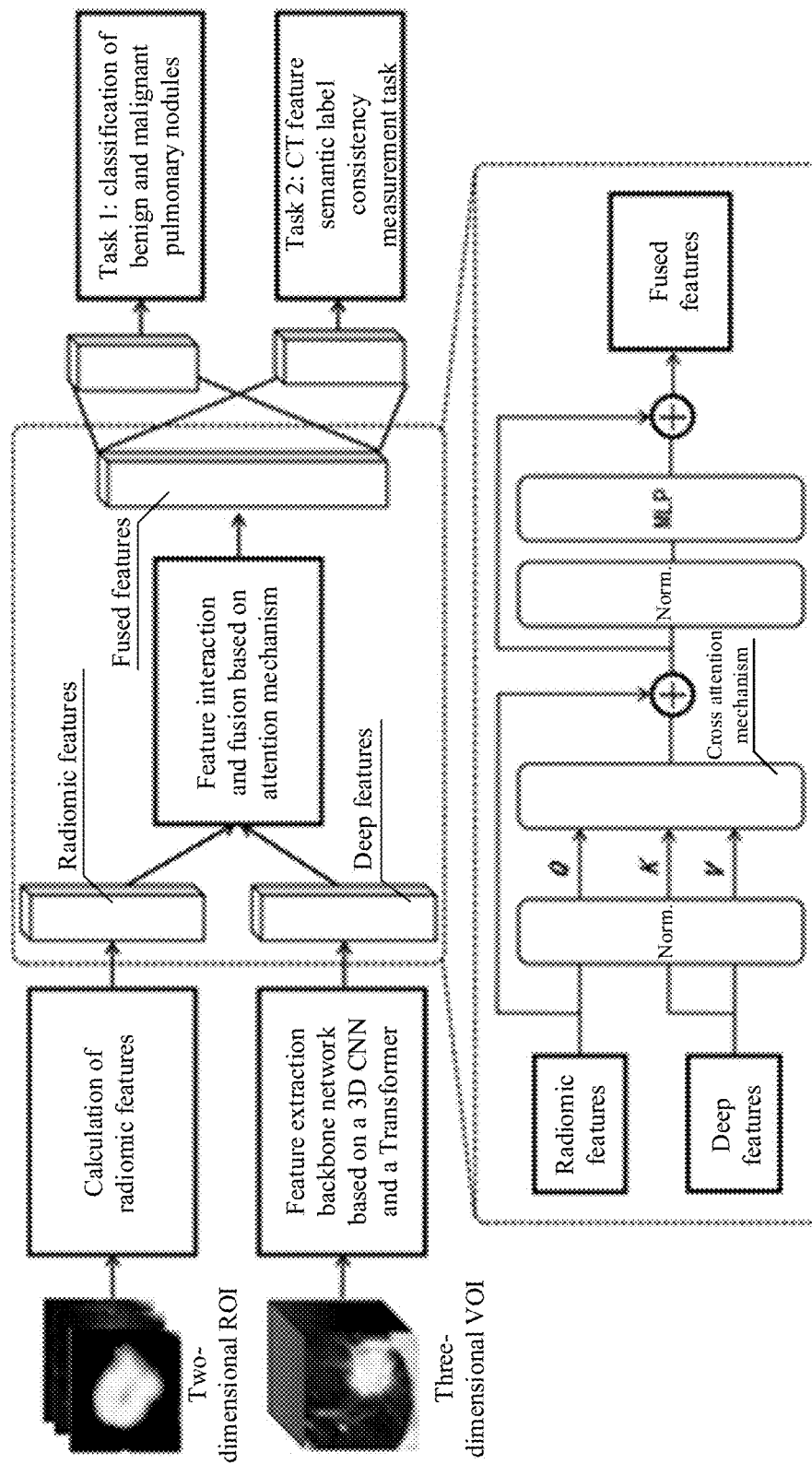
FIG. 2 is a schematic diagram of an overall architecture corresponding to an intelligent grading method for pulmonary nodules based on multi-modal feature fusion provided in the present disclosure.

In the embodiment, an implementation route is designed based on a main line of accurate feature extraction—classification algorithm design—algorithm verification and optimization, whose overall architecture is as shown in FIG. 2. As can be seen from the technical route shown in FIG. 2, data of a two-dimensional region of interest (ROI) and a three-dimensional volume of interest (VOI) of pulmonary nodules is obtained first based on chest CT examination images and corresponding examination reports, to obtain two-dimensional ROI and three-dimensional VOI input data for the pulmonary nodules as needed. Then, CT image features are obtained by using an accurate feature extraction model as needed. Further, image features from CT images, and non-image features from CT imaging reports, clinical information and serological examinations are used as multi-source heterogeneous multi-modal input data, a multi-classification algorithm is designed. Then, the classification algorithm is further improved by using algorithm verification and optimization schemes, to form a final fine grading model of pulmonary nodule malignancy.

The intelligent grading method for pulmonary nodules based on multi-modal feature fusion provided in an embodiment includes the following implementation steps.

In step 1, two-dimensional ROI data and three-dimensional VOI data of pulmonary nodules are obtained, and radiomics features corresponding to the two-dimensional ROI data and deep image features corresponding to the three-dimensional VOI data are obtained.

The two-dimensional ROI data and the three-dimensional VOI data of pulmonary nodules are obtained. Based on a multi-task learning framework, two-dimensional CT semantic features based on radiomics, and three-dimensional VOI features that fuse local-global multi-scale structural information by combining CNN and Transformer, are calculated respectively. With the Transformer model, three-dimensional CNN multi-scale features with spatial correlation are fully extracted, a shared feature subspace method with semantic feature preservation is constructed, a multi-task learning model based on simultaneous extraction and fusion of three-dimensional CNN convolution features and semantic features such as two-dimensional texture is designed, and effective fusion and complementation of pulmonary nodule information based on CT images is achieved.

Figure 3:
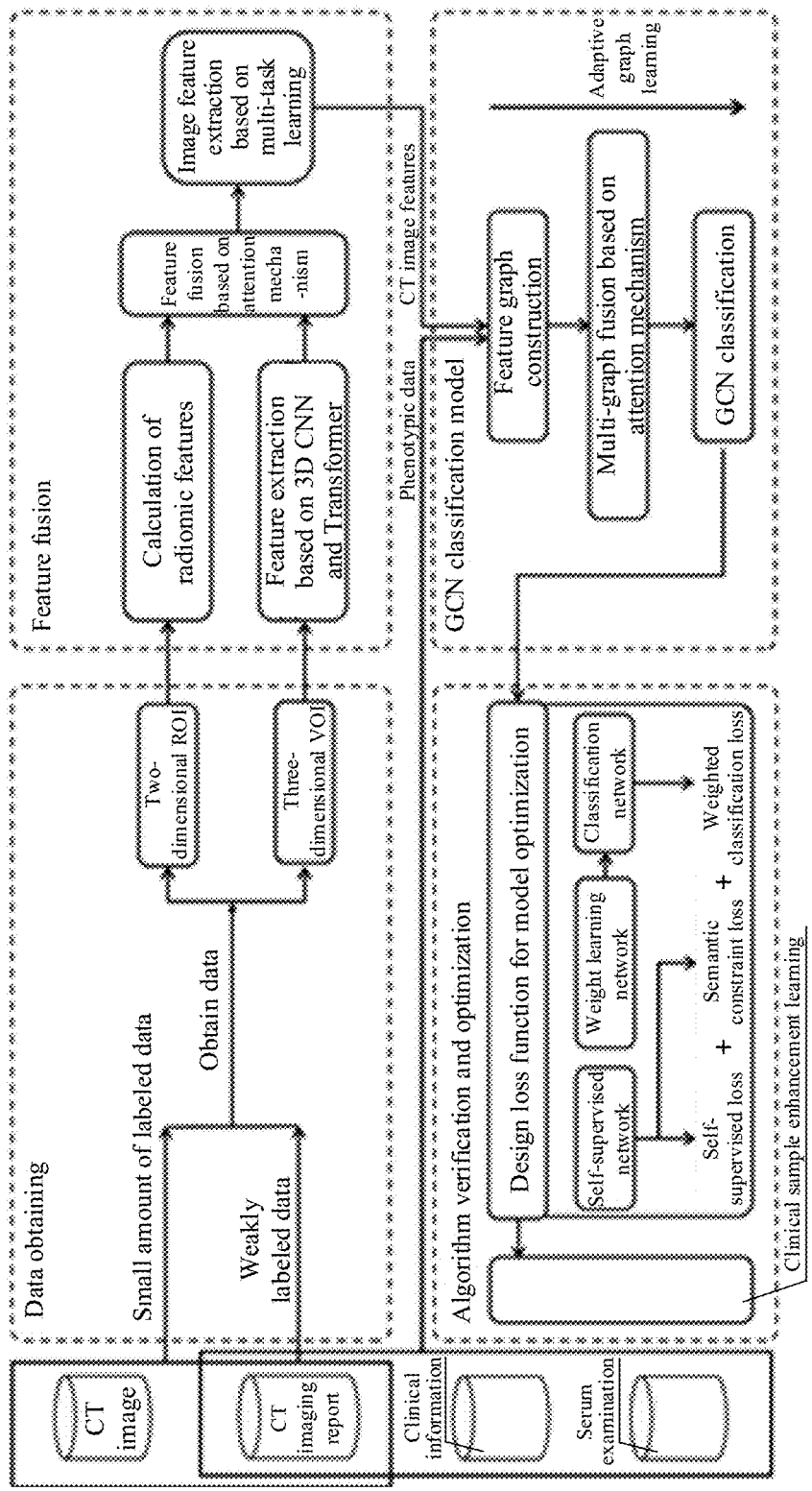
FIG. 3 is a schematic diagram of a network corresponding to accurate feature extraction.

FIG. 3 shows a technical route diagram for accurate feature extraction. Based on the obtained two-dimensional ROI data and three-dimensional VOI data of pulmonary nodules, CT features and characteristics such as a nodule location, a nodule size, calcification, texture and others are calculated by using radiomics and other methods. By designing a feature extraction backbone network that combines a 3D CNN and a Transformer, deep image features with fused three-dimensional local-global multi-scale structural information is obtained. Here, the three-dimensional VOI data is inputted to the feature extraction backbone network that combines the 3D CNN and the Transformer, to obtain the deep image features with fused three-dimensional local-global multi-scale structural information.

In step 2, the radiomics features and the deep image features are fused to obtain fused features.

Specifically, the radiomics features and the deep image features are fused based on attention mechanism. In conventional fusion of feature layers, different types of features are directly spliced, which easily lead to a problem of semantic gap between features. Particularly, most of existing research methods simply train a feature fusion module based on subsequent classification tasks, without considering possible semantic inconsistencies between various features. As a result, a problem of mutual exclusion of features may occur during the feature fusion. Therefore, in the embodiment of the present disclosure, multi-view information fusion is performed based on the Cross View Attention Block structure. The correlation between multi-dimensional and multi-type features is fully considered. Based on introducing CT feature semantic label consistency measurement, an effective fusion module of multiple types of features based on CT images is designed.

In a training stage of a learning feature fusion layer parameter model, not only subsequent classification tasks are considered, but also a CT feature semantic label consistency measurement task is designed for coordinated feedback. The two tasks are learned and trained in parallel and share the learned feature parameters, so that the image feature description with adequacy, discriminability, and robustness for the pulmonary nodules can be obtained.

In step 3, a feature representation and a graph structure of each modality is obtained, through a designed multi-modal information extraction method, based on CT imaging reports, clinical information, serological examinations and CT image features; and feature representations and graph structures obtained from different modalities are fused, by using attention mechanism, to obtain an overall sample feature graph with cross-modal feature fusion.

It is assumed that set $X=\{X^1, X^2, \ldots, X^M\}$ represents multi-modal feature information inputted originally, where $X^m=[x_1^m, x_2^m, \ldots, x_N^m] \in R^{N \times d_m}$, $m \in [1,M]$ represents a feature matrix of the m-th modality having N samples, and a feature dimension of the modality is $d_m$. A purpose of the multi-modal information extraction method is to extract a specific modal feature and graph structure from each piece of modal information, which is implemented by designing a modal information extraction network.

For simplicity, $X=[x_1, x_2, \ldots, x_N] \in R^{N \times d}$ represents an original feature matrix of a modal selected arbitrarily as an input to the modal information extraction network.

To improve a computational efficiency and performance of the model, the original input feature vector $x_i$ is projected to a low-dimensional feature space through a learnable function $f_A$, where $f_A$ is defined as a simple multi-layer perceptron (MLP), and a calculation process is expressed as:

$$\hat{x}_i = w_A^{(2)} \sigma \left( w_A^{(1)} x_i + b \right);$$

where $w_A^{(1)} \in R^{d \times d_1}$, $w_A^{(2)} \in R^{d_1 \times d_2}$ represent learnable weight parameters, and a represents a nonlinear activation function.

Then, a correlation between pairs of samples is calculated through cosine similarity, to obtain a similarity matrix $S \in R^{N \times N}$ characterizing the correlation between overall sample features, where a similarity between any two sample features is calculated as follows. For example, similarity $s_{ij}$ between sample i and sample j is calculated as:

$$S_{ij} = \frac{\hat{x}_i \cdot \hat{x}_j}{|\hat{x}_i| \cdot |\hat{x}_j|}$$

A threshold processing as shown below is performed on the similarity matrix S to obtain an adjacency matrix of the modality-specific graph structure:

$$A = \{(a_{ij})_{i,j=1}^N\} \in R^{N \times N};$$

$$a_{ij} = \begin{cases} s_{ij}, & s_{ij} > \theta \\ 0, & \text{otherwise} \end{cases};$$

where θ represents a threshold ranging from 0 to 1.

The feature matrix X and the graph structure A are inputted to a graph neural network to perform a feature aggregation transformation, and a calculation process from each input layer to an output layer of the graph neural network is expressed as:

$$H^{(l)} = \sigma \left( \mu_1 H^{(l-1)} W_e^{(l)} + \mu_2 D^{-1} A H^{(l-1)} W_n^{(l)} \right);$$

where σ represents a nonlinear activation function; $\mu_1$ and $\mu_2$ represent learnable weight coefficients; $W_e^{(l)}$ and $W_n^{(l)}$ represent two to-be-learned weight matrices of the l-th layer of the graph neural network; and D represents a degree matrix of an adjacency matrix A. There has $H^{(0)}=X$. Through feature update of the graph neural network, the output layer H of the graph neural network H is defined as an optimized feature representation $\tilde{X}$ of the modality.

The original feature vector X of each modality is used as an input, the optimized graph structure A and the feature representation $\tilde{X}$ of the modality are obtained through the designed modal information extraction network.

The cross-modal feature fusion based on attention mechanism refers to fusion of the multi-modal feature set $\tilde{X}=\{X^1, X^2, \ldots, X^M\}$ and the multi-modal graph structure set $A=\{A^1, A^2, \ldots, A^M\}$ obtained from different modalities through attention mechanism, to obtain a feature representation.

A feature of the i-th node is expressed as $x_i=[x_i^1, x_i^2, \ldots, x_i^M] \in R^{1 \times (M \times h)}$, and an attention score of each modality is obtained based on attention mechanism:

$$(\alpha^1, \alpha^2, \ldots, \alpha^m) = att(\tilde{x}^1, \tilde{x}^2, \ldots, \tilde{x}^M).$$

First, the multi-modal features are transformed through a nonlinear transformation, and then a shared attention vector q is used to obtain an attention value $\omega_i^m$:

$$\omega_i^m = q^T \text{Sigmoid}\left( W(\tilde{x}_i^m)^T + b \right)$$

where $W \in R^{h' \times h}$ and $q \in R^{h' \times 1}$ both represent learnable weight parameters. After the attention value of each modality is calculated, attention scores of all modalities are obtained through normalization:

$$\alpha_i^m = \text{soft max}(\omega_i^m) = \frac{\exp(\omega_i^m)}{\sum_{m=1}^{M} \exp(\omega_i^m)};$$

The attention scores of the modalities are multiplied with the optimized features and graph structures of the modalities correspondingly, and a summing operation is performed to obtain a final fused multi-modal feature and graph structure:

$$x_i^{final} = \sum_{m=1}^{M} \alpha_i^m \tilde{x}_i^m$$

$$a_i^{final} = \sum_{m=1}^{M} \alpha_i^m a_i^m$$

The final feature matrix $X^{final}$ and the graph structure $A^{final}$ are sent to a graph neural network classifier to output a final classification prediction result.

In an embodiment, the non-image feature includes CT examination reports, clinical information and serological examination data.

Regarding the problem that the multi-modal features of data from different sources have different effects on classification performance, multiple feature graphs are constructed in the embodiment by using nodule image features and non-image features from three different sources, and a multi-graph information fusion method is proposed based on attention mechanism.

In an embodiment, a joint training strategy with the GCN classification model is proposed. Besides of constructing a cross-modal feature graph on the front end through graph representation learning, a joint optimization with the GCN classification model may be performed, to reveal intrinsic connections between different samples and adaptively extract more correlation information between different samples, to effectively improve the classification performance. In view of the problem that different nodes propagate features at different speeds during a training process of the GCN classification algorithm and therefore easily lead to out-of-synchronization of feature updates in edge nodes of the network, a method for adaptively selecting an appropriate propagation range for each node through comprehensive use of jump connections and multi-head attention mechanisms is proposed.

Figure 4:
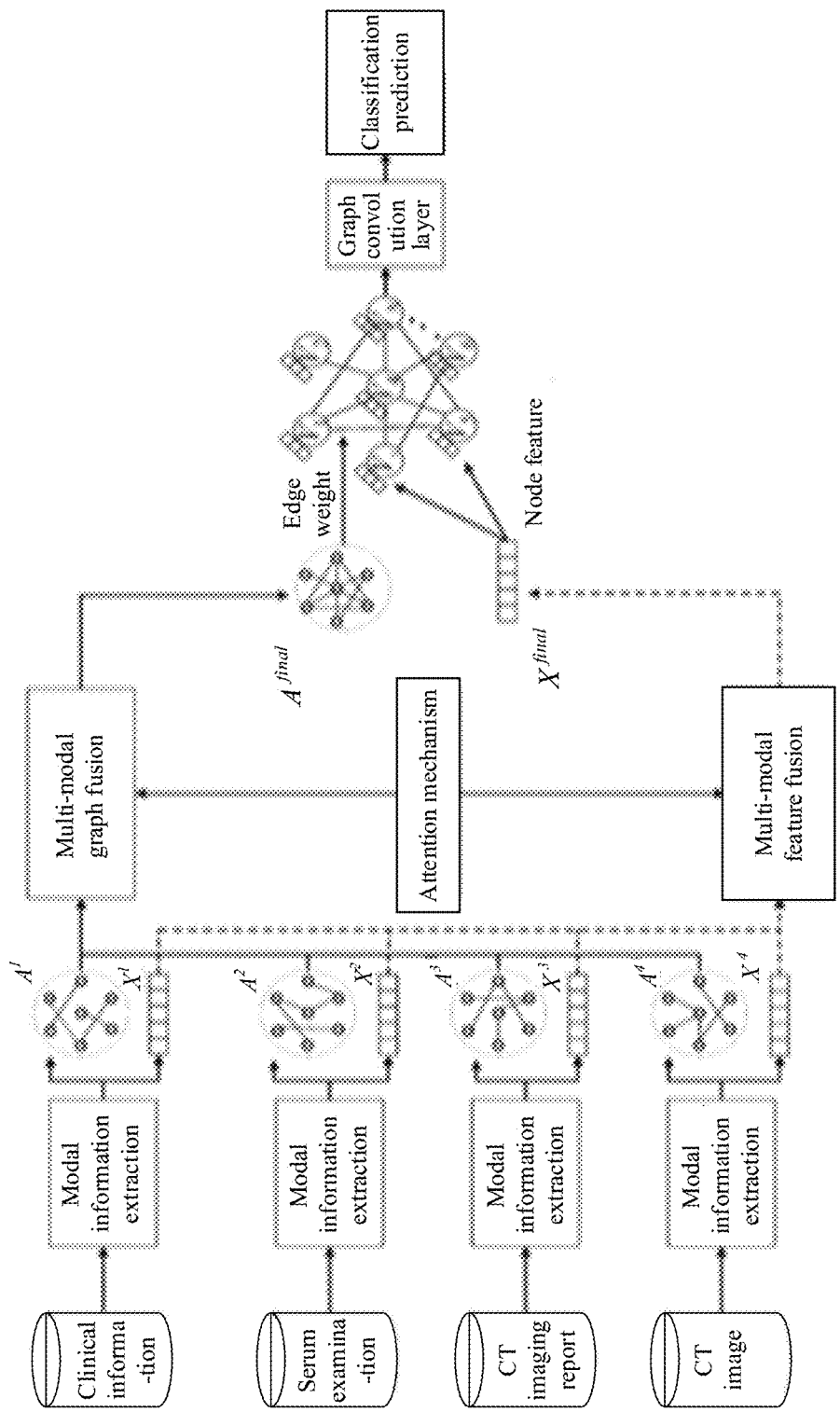
FIG. 4 is a schematic diagram of a network corresponding to a classification algorithm.

In view of the problem that a classification algorithm based on multi-modal learning generally ignores different effects exerted by different modal features on the classification performance of the overall model, a technical route of a classification algorithm design is provided in an embodiment, as shown in FIG. 4.

Graph structure learning is performed for different modal features. Through multiple graph representation learning and graph convolution layer channels, information aggregation within each modality is first performed separately, and then attention mechanism is utilized to realize information interaction and integration between modalities. Thereby, effective image features of nodes are extracted and delivered to a downstream classification model, to complete accurate grading prediction of pulmonary nodules.

In a process of graph structure modeling, adaptive graph representation learning training is performed by calculating Gaussian distance or cosine distance between features and other metric learning methods, to optimize the inputted graph structure, and information aggregation strategies are used to further improve an accuracy of the classification algorithm.

In step 4, a pulmonary nodule grading GCN model is constructed. The pulmonary nodule grading GCN model includes a classification network, a weight learning network and a self-supervised network. Based on the classification network, the weight learning network, and the self-supervised network, an overall loss function is obtained:

Graph data enhancement can create new graph data through certain transformations without changing the semantics. The created graph data are utilized to collaboratively train the GCN, thereby improving classification performance and robustness. Common methods include node discarding, edge perturbation, changing node attribute masks and sampling subgraph by random walk. Doctors often save some typical case data, and improve clinical diagnosis accuracy through comparative diagnosis. Therefore, in the embodiment, a method of creating collaborative training graph data based on the typical case data is proposed under a condition of ensuring consistency of graph semantics, and a design method of a semantic constraint loss function for measuring approximation of class distribution under different views to original graph semantics is designed.

In a loss function design for model optimization, a prerequisite for graph data enhancement is to ensure consistency of graph semantics, that is, a predicted label should not change significantly due to data enhancement. In self-supervised contrastive learning, it is required to maximize a similarity of positive sample pairs and minimize a similarity of negative sample pairs, to increase a class distance. Therefore, in an embodiment, the weighted cross-entropy loss function, the semantic constraint loss function, and the self-supervised contrastive loss function are designed first, to obtain an improved overall loss. Then, the trained model is integrated into an independently developed product called Picture Archiving and Communication Systems (PACS) Software, and deployed to the hospital for on-site trial evaluation, to better use expert prior knowledge of clinicians, improve the overall loss function $L_{GL}$ to tune the model, and improve generalization performance of the model.

Figure 5:
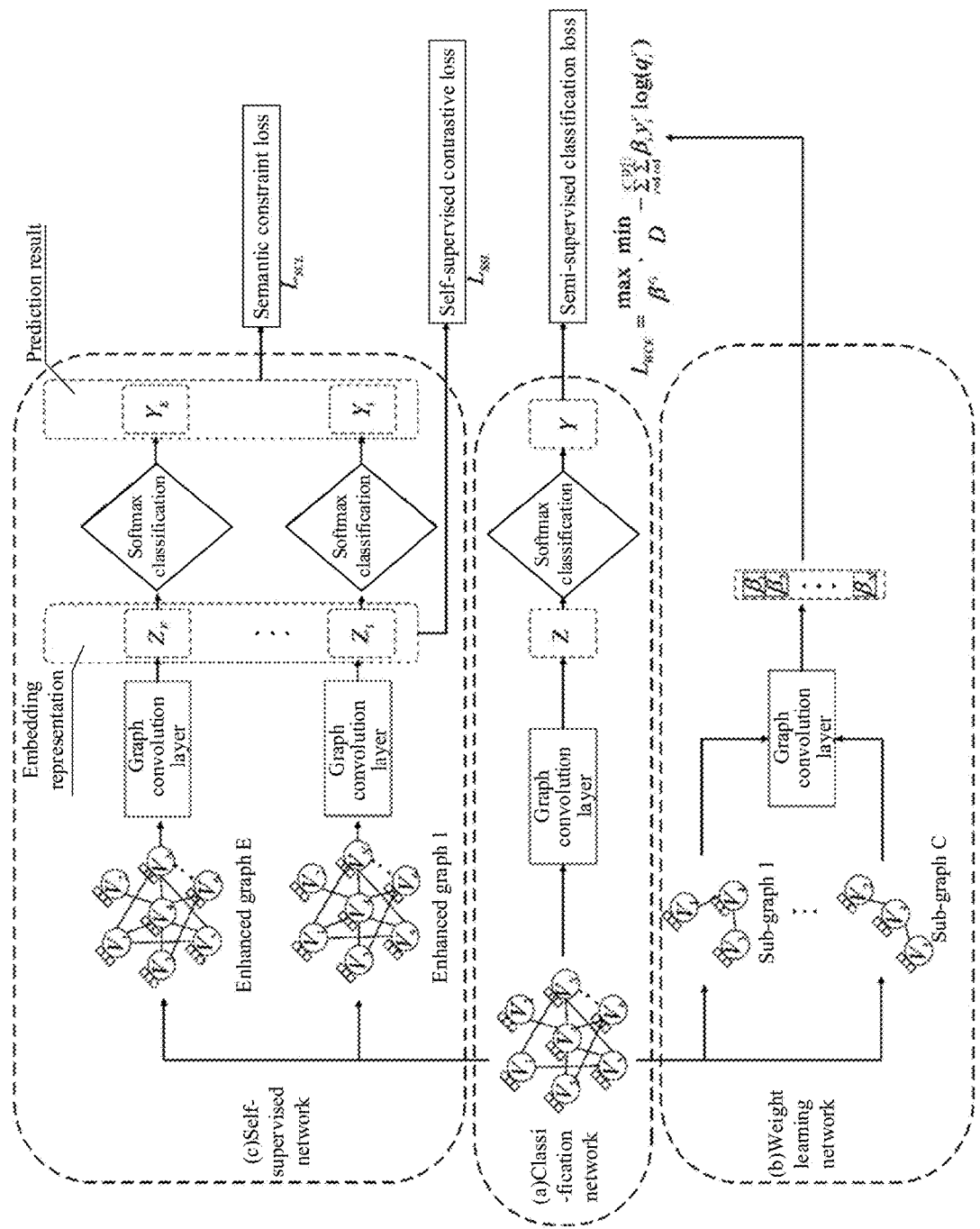
FIG. 5 is a schematic diagram of a network corresponding to algorithm verification and optimization.

In real-world scenarios, there is a serious imbalance in the number of samples for the pulmonary nodules of different grades. To solve this problem and further improve the performance and versatility of the algorithm, an algorithm optimization technical route based on self-supervised learning is provided in an embodiment as shown in FIG. 5, which includes three components, i.e., (a) a classification network; (b) a weight learning network; and (c) a self-supervised network.

An overall loss function of the whole classification network is composed of a weighted cross-entropy loss function, a semantic constraint loss function and a self-supervised contrastive loss function, as expressed below:

$$L_{GL} = \alpha_1 L_{WCE} + \alpha_2 L_{SCL} + \alpha_3 L_{SSL}$$

where $\alpha_1$, $\alpha_2$, and $\alpha_3$ represent trade off hyper-parameters, $L_{WCE}$ represents the weighted cross-entropy loss function, $L_{SCL}$ represents the semantic constrain loss function, and $L_{SSL}$ represents the self-supervised contrastive loss function;

With the designed weight network, weights of samples are learned, and the weighted cross-entropy loss function shown below is optimized through mutual compete of the weight network and the classification network. In this way, the problem of class imbalance can be alleviated to a certain extent.

$$L_{WCE} = \frac{\max}{\beta^{c_i}} \frac{\min}{D} - \sum_{c=1}^{|C|} \sum_{i=1}^{|Y_L^c|} \beta_i y_i^c \log(q_i^c);$$

In a process of designing the self-supervised network, an objective is to further expand the supervision information through graph data enhancement while ensuring the consistency of graph semantics, and another objective is to increase the class distance of the classification algorithm through self-supervised contrastive learning. Therefore, the algorithm performance and robustness can be further improved. The semantic constraint loss function and the self-supervised contrastive loss function are expressed as:

$$L_{SCL} = \frac{1}{E} \sum_{i=1}^{E} W(\hat{Y}^{(i)}, Y);$$

$$L_{SSL} = \frac{1}{N \cdot E} \sum_{u \in E} \sum_{\substack{i=1 \\ j=1 \\ i \neq j}}^{E} L(Z_u^{(i)}, Z_u^{(j)});$$

where E represents the number of views, $W(\hat{Y}^{(i)}, Y)$ represents a distance measure between the i-th view class label distribution and an original view class label distribution.

In step 5, the pulmonary nodules are graded with the pulmonary nodule grading GCN model.

The pulmonary nodules are graded with the pulmonary nodule grading GCN model trained in step 4.

An intelligent grading system for pulmonary nodules based on multi-modal feature fusion is further provided in an embodiment. The system includes a processor and a memory.

The processor is configured to process instructions stored in the memory to implement the intelligent grading method for pulmonary nodules based on multi-modal feature fusion. The intelligent grading method for pulmonary nodules based on multi-modal feature fusion is described in detail in the above embodiments, and is not repeated here.

Therefore, in view of the clinical problem of difficulty in fine grading of malignancy assessment of pulmonary nodules, a multi-classification algorithm for pulmonary nodules with high efficiency, high precision and continuous learning capabilities is designed by utilizing real-world clinical multi-modal data and solving the key scientific problem of accurate feature extraction and effective fusion of multi-modal data. Further, through algorithm optimization and clinical verification, the intelligent diagnosis model for pulmonary nodules is formed. Doctors are assisted in correctly managing the growing number of patients with pulmonary nodules, and a rational allocation of medical resources and standardization of clinical diagnosis and treatment of pulmonary nodules are prompted.

Beneficial effects are specifically described below.

(1) In terms of medical image analysis, a multi-task learning model based on simultaneous extraction and fusion of three-dimensional CNN convolution features and semantic features such as two-dimensional texture is designed; an effective multi-dimensional and multi-type image feature fusion module is designed based on attention mechanism; and a precise feature description that fuses local-global multi-scale structural information and has semantic consistency is obtained. A new method for small target feature extraction based on three-dimensional CT images is provided.

(2) In terms of multi-modal data analysis, by proposing a method for effective fusion of multi-graph construction based on adaptive graph representation learning and multi-graph information based on attention mechanism, a high-precision GCN multi-classification algorithm with cross-modal feature fusion is designed. Fine grading of pulmonary nodule malignancy is achieved with slight differences, providing a new approach to design of fine-grained classification algorithms.

(3) In terms of solving clinical problems, a classification algorithm optimization method and clinical verification scheme that organically combines generative self-supervised learning and comparative self-supervised learning is proposed, which can form an intelligent diagnosis model for pulmonary nodules and is expected to assist doctors in scientific evaluation and treatment of pulmonary nodules. Hence, delayed diagnosis or over diagnosis of lung cancer is avoided, and standardization of clinical diagnosis and treatment of pulmonary nodules is promoted.

The invention claimed is:

1. An intelligent grading method for pulmonary nodules based on multi-modal feature fusion, comprising:
   (1) designing a multi-task feature extraction network based on attention mechanism, to obtain an image feature description with adequacy and discriminability, comprising obtaining data of a two-dimensional region of interest (ROI) and a three-dimensional volume of interest (VOI) of pulmonary nodules based on chest CT examination images and corresponding imaging reports, extracting radiomics features and deep image features from the ROI and the VOI, respectively, and performing feature fusion to obtain the image feature description for the pulmonary nodules;
   (2) designing a multi-modal feature fusion method based on graph representation learning, to obtain an overall sample feature graph with fusion of cross-modal features, comprising obtaining, based on CT imaging reports, clinical information, serological examinations and CT image features, a specific feature representation and a graph structure of each modal through a multi-modal information extraction method, and fusing the feature representations and the graph representation structures obtained from different modalities by using attention mechanism, to obtain the overall sample feature graph with cross-modal feature fusion;
   (3) proposing an optimization and clinical verification method based on self-supervised learning GCN classification model, to form a pulmonary nodule grading and diagnosis model, comprising constructing a pulmonary nodule grading Graph Convolutional Network (GCN) model, which comprises a classification network, a weight learning network and a self-supervised network, designing an overall loss function, and training and optimizing the pulmonary nodule grading GCN model to achieve fine grading of pulmonary nodule malignancy; and
   grading the pulmonary nodules with the pulmonary nodule grading GCN model,
   wherein in the designed multi-modal feature fusion method based on graph representation learning, the specific feature representation and the graph structure of each modality are obtained through the multi-modal information extraction method; and then the feature representations and graph structures obtained from different modalities are fused by using attention mechanism, to obtain data of the overall sample feature graph with cross-modal feature fusion;

assuming that set $X=\{X^1, X^2, \ldots, X^M\}$ represents multi-modal feature information inputted originally, where $X^m=[x_1^m, x_2^m, \ldots, x_N^m] \in R^{N \times d_m}$, $m \in [1, M]$ represents a feature matrix of the m-th modality having N samples, and a feature dimension of the modality is $d_m$;

(1) in the multi-modal information extraction method, a purpose of the multi-modal information extraction method is to extract the specific modal feature and the graph structure from each piece of modal information, which is implemented by designing a modal information extraction network;

$X=[x_1, x_2, \ldots, x_N] \in R^{N \times d}$ represents an original feature matrix of a modal selected arbitrarily as an input to the modal information extraction network; the original input feature vector $x_i$ is projected to a low-dimensional feature space through a learnable function $f_A$, where $f_A$ is defined as a simple multi-layer perceptron MLP, and a calculation process is expressed as equation (1):

$$\hat{x}_i = w_A^{(2)} \sigma(w_A^{(1)} x_i + b) \quad (1)$$

where $w_A^{(1)} \in R^{d \times d_1}$, $w_A^{(2)} \in R^{d_1 \times d_2}$ represent learnable weight parameters, and $\sigma$ represents a nonlinear activation function; then, a correlation between pairs of samples is calculated through cosine similarity, to obtain a similarity matrix $S \in R^{N \times N}$ characterizing the correlation between overall sample features, where a similarity between any two sample features is calculated through equation (2), that is, similarity $s_{ij}$ between sample i and sample j is calculated as $$s_{ij} = \frac{\hat{x}_i \cdot \hat{x}_j}{|\hat{x}_i| \cdot |\hat{x}_j|} \quad (2)$$

a threshold processing as shown in equation (3) is performed on the similarity matrix S to obtain an adjacency matrix of the modality-specific graph structure:

$A=\{(a_{ij})_{i,j=1}^N\} \in R^{N \times N}$;

$$a_{ij} = \begin{cases} s_{ij}, & s_{ij} > \theta \\ 0, & \text{otherwise} \end{cases} \quad (3)$$

where $\theta$ represents a threshold ranging from 0 to 1;

the feature matrix X and the graph structure A are inputted to a graph neural network to perform a feature aggregation transformation, and a calculation process from each input layer to an output layer of the graph neural network is expressed as equation (4):

$$H^{(l)} = \sigma(\mu_1 H^{(l-1)} W_e^{(l)} + \mu_2 D^{-1} A H^{(l-1)} W_n^{(l)}) \quad (4)$$

where $\sigma$ represents a nonlinear activation function, $\mu_1$ and $\mu_2$ represent learnable weight coefficients, $W_e^{(l)}$ and $W_n^{(l)}$ represent two weight matrices to be learned of a l-th layer in the graph neural network, D represents a degree matrix of an adjacency matrix A, there has $H^{(o)}=X$, through feature update of the graph neural network, the output layer H of the graph neural network is defined as an optimized feature representation $\tilde{X}$ of the modality;

the original feature vector X of each modality is used as an input, the optimized graph structure A and the feature representation $\tilde{X}$ of the modality are obtained through the designed modal information extraction network;

(2) in the cross-modal feature fusion based on attention mechanism, the cross-modal feature fusion based on attention mechanism refers to fusion of a multi-modal feature set $\tilde{X}=\{\tilde{X}^1, \tilde{X}^2, \ldots, \tilde{X}^M\}$ and a multi-modal graph structure set $A=\{A^1, A^2, \ldots, A^M\}$ obtained from different modalities through attention mechanism, to obtain a cross-modal feature representation;

where a feature of an i-th node is expressed as $x_i=[x_i^1, x_i^2, \ldots, x_i^M] \in {}^{1 \times (M \times h)}$, and an attention score of each modality is obtained based on attention mechanism:

$$(\alpha^1, \alpha^2, \ldots, \alpha^M) = att(\tilde{x}^1, \tilde{x}^2, \ldots, \tilde{x}^M);$$

the multi-modal features are transformed through a non-linear transformation, and then a shared attention vector q is used to obtain an attention value $\omega_i^m$:

$$\omega_i^m = q^T \text{Sigmoid}(W(\tilde{x}_i^m)^T + b) \quad (5)$$

where $W \in R^{h \times h}$ and $q \in R^{h \times 1}$ are learnable weight parameters; after the attention value of each modality is calculated, attention scores of all modalities are obtained through normalization:

$$\alpha_i^m = \text{soft max}(\omega_i^m) = \frac{\exp(\omega_i^m)}{\sum_{m=1}^M \exp(\omega_i^m)} \quad (6)$$

the attention scores of the modalities are multiplied with the optimized features and graph structures of the modalities correspondingly, and a summing operation is performed to obtain a final fused multi-modal feature and graph structure:

$$x_i^{final} = \sum_{m=1}^M \alpha_i^m \tilde{x}_i^m \quad (7)$$

$$a_i^{final} = \sum_{m=1}^M \alpha_i^m a_i^m \quad (8)$$

(3) in the classification prediction based on the graph neural network the final feature matrix $X^{final}$ and the graph structure $A^{final}$ are sent to a graph neural network classifier to output a final classification prediction result;

wherein the overall loss function is composed of a weighted cross-entropy loss function, a semantic constraint loss function and a self-supervised contrastive loss function;

the overall loss function is expressed as equation (9)

$$L_{GL} = \alpha_1 L_{WCE} + \alpha_2 L_{SCL} + \alpha_3 L_{SSL} \quad (9)$$

where $\alpha_1$, $\alpha_2$, and $\alpha_3$ represent trade off hyper-parameters, $L_{WCE}$ represents the weighted cross-entropy loss function, $L_{SCL}$ represents the semantic constrain loss function, and $L_{SSL}$ represents the self-supervised contrastive loss function; the weighted cross-entropy loss function is expressed as $$L_{WCE} = \max_{\beta^{c_i}} \min_{D} -\sum_{c=1}^{|C|} \sum_{i=1}^{|Y_i^c|} \beta_i y_i^c \log(q_i^c)$$

the semantic constraint loss function is expressed as $$L_{SCL} = \frac{1}{E} \sum_{i=1}^{E} W(\widehat{Y^{(i)}}, Y)$$

the self-supervised contrastive loss function is expressed as $$L_{SSL} = \frac{1}{N \cdot E} \sum_{u \in E} \sum_{\substack{i=1 \\ j=1 \\ i \neq j}}^{E} L(Z_u^{(i)}, Z_u^{(j)})$$

where E represents the number of views, $W(\widehat{Y^{(i)}}, Y)$ represents a distance measure between an i-th view class label distribution and an original view class label distribution.

2. The intelligent grading method for pulmonary nodules based on multi-modal feature fusion according to claim 1, further comprising obtaining the overall sample feature graph to be inputted to a graph convolutional neural network classifier, wherein non-image feature comprises feature metrics derived from CT examination reports, clinical information, and serological examination data.

3. The intelligent grading method for pulmonary nodules based on multi-modal feature fusion according to claim 1, further comprising proposing an accurate extraction method of multiple types of image features based on CT examination data, wherein the radiomics features and the deep image features are calculated in parallel based on the two-dimensional ROI and the three-dimensional VOL, respectively, and the radiomics features and the deep image features are effectively fused based on attention mechanism; in a training stage of a learning feature fusion layer parameter model, subsequent classification tasks are considered, and a CT feature semantic label consistency measurement task is designed for coordinated feedback; and the image feature description with adequacy and discriminability for the pulmonary nodules is obtained through parallel learning and training of the two tasks and sharing the learned feature parameters.

4. The intelligent grading method for pulmonary nodules based on multi-modal feature fusion according to claim 1, wherein a process of obtaining the deep image features corresponding to the three-dimensional VOI data comprises: inputting the three-dimensional VOI data to a feature extraction backbone network that combines a 3D CNN and a Transformer, to obtain the deep image features with fused three-dimensional local-global multi-scale structural information.

5. The intelligent grading method for pulmonary nodules based on multi-modal feature fusion according to claim 1, wherein in obtaining an optimized feature representation and graph structure of each modality through the multi-modal information extraction method, the number of modalities and a feature dimension are set arbitrarily.

6. The intelligent grading method for pulmonary nodules based on multi-modal feature fusion according to claim 1, wherein in the cross-modal feature fusion method based on attention mechanism, learning is performed according to an end-to-end graph structure representation, to obtain a contribution score of each modal feature.

7. An intelligent grading system for pulmonary nodules based on multi-modal feature fusion, comprising a processor and a memory, wherein the processor is configured to process instructions stored in the memory to implement the intelligent grading method for pulmonary nodules based on multi-modal feature fusion according to claim 1.

8. An intelligent grading system for pulmonary nodules based on multi-modal feature fusion, comprising a processor and a memory, wherein the processor is configured to process instructions stored in the memory to implement the intelligent grading method for pulmonary nodules based on multi-modal feature fusion according to claim 2.

9. An intelligent grading system for pulmonary nodules based on multi-modal feature fusion, comprising a processor and a memory, wherein the processor is configured to process instructions stored in the memory to implement the intelligent grading method for pulmonary nodules based on multi-modal feature fusion according to claim 3.

10. An intelligent grading system for pulmonary nodules based on multi-modal feature fusion, comprising a processor and a memory, wherein the processor is configured to process instructions stored in the memory to implement the intelligent grading method for pulmonary nodules based on multi-modal feature fusion according to claim 4.

11. An intelligent grading system for pulmonary nodules based on multi-modal feature fusion, comprising a processor and a memory, wherein the processor is configured to process instructions stored in the memory to implement the intelligent grading method for pulmonary nodules based on multi-modal feature fusion according to claim 5.

12. An intelligent grading system for pulmonary nodules based on multi-modal feature fusion, comprising a processor and a memory, wherein the processor is configured to process instructions stored in the memory to implement the intelligent grading method for pulmonary nodules based on multi-modal feature fusion according to claim 6.

* * * * *